US012757026B2

(12) United States Patent
Mecheri Ravisubramanian

(10) Patent No.: US 12,757,026 B2
(45) Date of Patent: Oct. 6, 2026

(54) DIGITAL KEY PAIRING DEVICE AND METHOD

(71) Applicants: Hyundai Motor Company, Seoul (KR); Kia Corporation, Seoul (KR)

(72) Inventor: Gowri Shankar Mecheri Ravisubramanian, Chennai (IN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 343 days.

(21) Appl. No.: 18/414,873

(22) Filed: Jan. 17, 2024

(65) Prior Publication Data

US 2025/0175804 A1 May 29, 2025

(30) Foreign Application Priority Data

Nov. 24, 2023 (IN) ............................ 202311079950

(51) Int. Cl.
*H04W 4/40* (2018.01)
*H04B 5/70* (2024.01)
*H04L 67/12* (2022.01)
*H04W 12/50* (2021.01)

(52) U.S. Cl.
CPC .............. *H04W 12/50* (2021.01); *H04B 5/70* (2024.01); *H04L 67/12* (2013.01); *H04W 4/40* (2018.02)

(58) Field of Classification Search
CPC ......... H04W 12/50; H04W 4/40; H04W 4/80; H04B 5/70; H04B 5/20; H04L 67/12
See application file for complete search history.

(56) References Cited

U.S. PATENT DOCUMENTS

2016/0269403 A1* 9/2016 Koutenaei ............. H04L 63/102
2019/0281450 A1* 9/2019 Lu ....................... H04W 12/068
2024/0204536 A1* 6/2024 Lee .................... G07C 9/00309

FOREIGN PATENT DOCUMENTS

WO WO-2018002895 A1 * 1/2018 ...... H04M 1/724098

* cited by examiner

*Primary Examiner* — Chuong A Ngo
(74) *Attorney, Agent, or Firm* — MORGAN, LEWIS & BOCKIUS LLP

(57) ABSTRACT

Provided is a digital key pairing device and method. The digital key pairing device includes: an NFC tagging detection module for detecting that a mobile device is located on a wireless charger and Near Field Communication (NFC) tagging is occurred; an audio device pairing detection module for detecting a pairing of the mobile device with an audio device; a digital key process initiation module for initiating a digital key process when the NFC tagging and the pairing with the audio device have occurred; a user interface display module for displaying a user interface requesting confirmation to register a digital key on an in-vehicle display device; and a digital key registration module for registering the digital key when an registration request is received through the user interface.

12 Claims, 4 Drawing Sheets

DIGITAL KEY PAIRING DEVICE AND METHOD

CROSS-REFERENCE TO RELATED APPLICATION

The present application claims priority to Indian Patent Application number 202311079950 filed in the Indian Patent Office on Nov. 24, 2023, the entire contents of which is incorporated herein for all purposes by this reference.

BACKGROUND OF THE PRESENT DISCLOSURE

Field of the Present Disclosure

The present disclosure relates to a digital key pairing device and method.

Description of Related Art

A digital key is a key replaced for a physical vehicle key with digital technology, which allows a user to start a car's engine, lock car's doors, unlock car's doors, and the like through a smart phone. Digital keys may enable communication between a smart phone and a vehicle by use of wireless communication technologies, such as Bluetooth Low Energy (BLE) or Near Field Communication (NFC). These digital keys have the advantage of being more difficult to steal or duplicate than traditional physical keys because they use encrypted signals, while still providing convenience. As a result, digital keys are being actively applied in the automotive industry.

Digital keys require a pairing process that allows a user's smart phone and vehicle to recognize and communicate with each other. Typically, the pairing process involves several steps, including a process of manipulating and connecting an audio device of a vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a digital key pairing device and method that enables convenient and safe pairing of a digital key through an NFC triggered wireless charger.

An exemplary embodiment provides a digital key pairing device including: an NFC tagging detection module for detecting that a mobile device is located on a wireless charger and Near Field Communication (NFC) tagging is established; an audio device pairing detection module for detecting a pairing of the mobile device with an audio device; a digital key process initiation module for initiating a digital key process when the NFC tagging and the pairing with the audio device have occurred; a user interface display module for displaying a user interface requesting confirmation to register a digital key on an in-vehicle display device; and a digital key registration module for registering the digital key when an registration request is received through the user interface.

In some exemplary embodiments, the digital key registration module may not register the digital key when a cancel input is received through the user interface.

In some exemplary embodiments, the digital key pairing device may further include an email sending module for generating and sending an email requesting confirmation to register the digital key.

In some exemplary embodiments, the digital key registration module may register the digital key when an registration request is received through a link included in the email.

In some exemplary embodiments, the digital key process initiation module may not initiate the digital key process even when the NFC tagging and the pairing with the audio device have occurred when a digital key teaching mode is disabled on the mobile device.

In some exemplary embodiments, the audio device pairing detection module may change vehicle audio Bluetooth from an OFF state to an ON state when a digital key teaching mode is enabled on the mobile device.

Another exemplary embodiment provides a digital key pairing method, including: detecting that a mobile device is located on a wireless charger and Near Field Communication (NFC) tagging has occurred; detecting that a pairing of the mobile device with an audio device has occurred; when the NFC Tagging and the pairing with the audio device have occurred, initiating a digital key process; displaying a user interface requesting confirmation to register a digital key on an in-vehicle display device; and registering the digital key when an registration request is received through the user interfaces.

In some exemplary embodiments, the registering of the digital key may include not registering the digital key when a cancel input is received through the user interface.

In some exemplary embodiments, the digital key pairing method may further include generating and sending an email requesting confirmation to register the digital key.

In some exemplary embodiments, the registering of the digital key may include registering the digital key when an registration request is received through a link included in the email.

In some exemplary embodiments, the initiating of the digital key process may include not initiating the digital key process even when the NFC tagging and the pairing with the audio device has occurred when a digital key teaching mode is disabled on the mobile device.

In some exemplary embodiments, the digital key pairing method may further include changing vehicle audio Bluetooth from an OFF state to an ON state when a digital key teaching mode is enabled on the mobile device.

According to the exemplary embodiments, it is possible to conveniently and safely pair a digital key through the NFC triggered wireless charger.

The methods and devices of the present disclosure have other features and advantages which will be apparent from or are set forth in more detail in the accompanying drawings, which are incorporated herein, and the following Detailed Description, which together serve to explain certain principles of the present disclosure.

Figure 1:
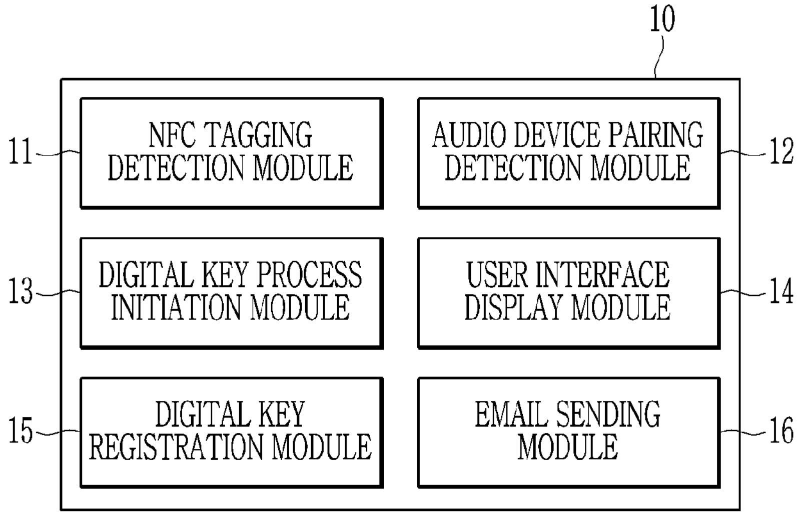
FIG. 1 is a block diagram illustrating a digital key pairing device according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following, various exemplary embodiments of the present disclosure will be described more fully hereinafter with reference to the accompanying drawings, in which exemplary embodiments of the present disclosure are shown. As those skilled in the art would realize, the described exemplary embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and the claims, unless explicitly described to the contrary, the word "comprise" will be understood to imply the inclusion of stated elements but not the exclusion of any other elements. Terms including an ordinary number, such as first and second, are used for describing various constituent elements, but the constituent elements are not limited by the terms. The terms are used only to discriminate one constituent element from another constituent element.

Furthermore, the terms " . . . unit", "-or", and "module" described in the specification mean units for processing at least one function and operation and may be implemented by hardware or circuits, software, or a combination of hardware or circuits and software. Furthermore, at least some of the configurations or functions of a digital key pairing device and method according to the exemplary embodiments described below may be implemented as programs or software, and the programs or software may be stored on a computer-readable medium.

FIG. 1 is a block diagram illustrating a digital key pairing device according to an exemplary embodiment of the present disclosure.

Referring to FIG. 1, the digital key pairing device 10 according to the exemplary embodiment of the present disclosure may pair a digital key via an NFC triggered wireless charger. To the present end, the digital key pairing device 10 may include an NFC tagging detection module 11, an audio device pairing detection module 12, a digital key process initiation module 13, a user interface display module 14, a digital key registration module 15, and an email sending module 16.

The NFC tagging detection module 11 may detect that a mobile device (for example, a smart phone) is located on a wireless charger and is NFC tagged. A wireless charger is a device used to wirelessly charge a smart phone's battery in a vehicle and may include a charging pad on which the smart phone is placed on, a grip or holder to stabilize the smart phone, and a power supply, including a cigarette lighter or USB port. NFC is a standard for exchanging small amounts of data between devices that can communicate over very short distances, typically less than 10 centimeters. In addition to device pairing, NFC may also be used for mobile payments, tickets and airline tickets, and simple information sharing. NFC tagging may be accomplished by bringing the mobile device up to a wireless charger.

The audio device pairing detection module 12 may detect that a mobile device has been paired with an audio device. Pairing a mobile device with an audio device may be done automatically after the initial connection.

In some exemplary embodiments, the audio device pairing detection module 12 may change the vehicle audio Bluetooth from an OFF state to an ON state when a digital key-teaching mode is enabled on the mobile device.

The digital key process initiation module 13 may initiate the digital key process when NFC tagging and the pairing with the audio device have occurred. The digital key process may refer to any of the usual steps that are taken prior to registering a digital key.

In some exemplary embodiments, when the digital key teaching mode is disabled on the mobile device, the digital key process initiation module 13 may not initiate the digital key process even when NFC tagging and the pairing with the audio device have occurred.

The user interface display module 14 may display a user interface on an in-vehicle display device (such as a display device attached to the audio device) requesting confirmation to register the digital key.

The digital key registration module 15 may register the digital key when receiving an registration request through the user interface. In contrast, the digital key registration module 15 may not register the digital key when receiving a cancel input through the user interface.

The email sending module 16 may be configured to generate and send an email requesting confirmation to register the digital key. In addition to, or instead of, displaying a user interface on an in-vehicle display device (such as a display device attached to an audio device) requesting confirmation to register the digital key, an email may be sent. The digital key registration module 15 may register the digital key when receiving the registration request through a link included in the email. In contrast, the digital key registration module 15 may not register the digital key when the registration request is not received through a link included in the email.

According to the example embodiment, the digital key may be conveniently and safely paired with the NFC-triggered wireless charger.

Figure 2:
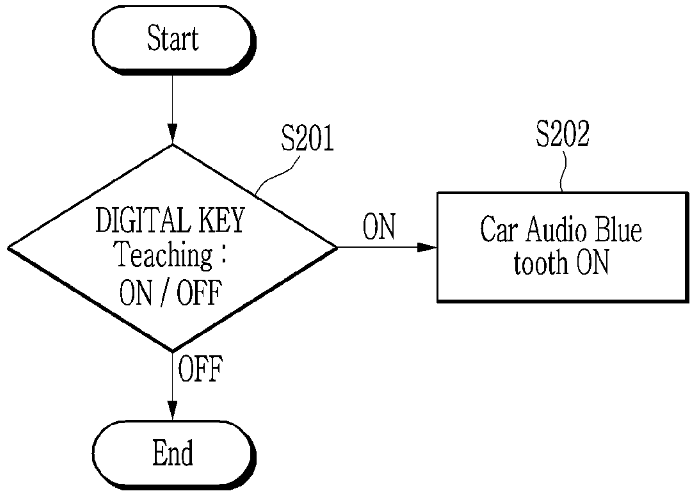
FIG. 2 is a flow diagram illustrating a digital key pairing method according to an exemplary embodiment of the present disclosure.

FIG. 2 is a flow diagram illustrating a digital key pairing method according to an exemplary embodiment of the present disclosure.

Referring to FIG. 2, a digital key pairing method according to an exemplary embodiment of the present disclosure may include operation S201 of determining whether a digital key teaching mode is enabled on a mobile device. Furthermore, the method may include operation S202 of changing the vehicle audio Bluetooth from an OFF state to an ON state when the digital key teaching mode is enabled on the mobile device. In the meantime, the method may be terminated when the digital key teaching mode is not enabled on the mobile device.

Figure 3:
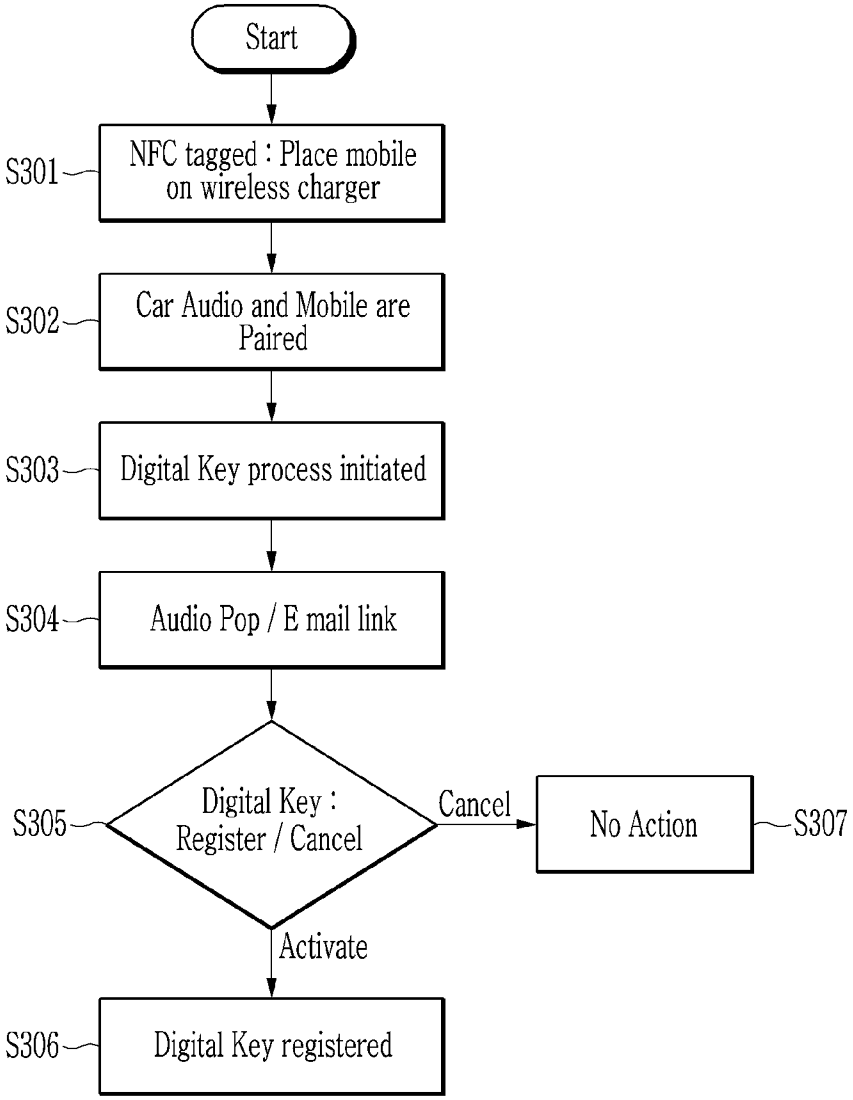
FIG. 3 is a flow diagram illustrating a digital key pairing method, according to an exemplary embodiment of the present disclosure.

FIG. 3 is a flow diagram illustrating a digital key pairing method according to an exemplary embodiment of the present disclosure.

Referring to FIG. 3, a digital key pairing method according to an exemplary embodiment of the present disclosure may include operation S301 of detecting that a mobile device is positioned on a wireless charger and NFC tagging is occurred, operation S302 of detecting that pairing of the mobile device with the audio device has occurred, operation S303 of initiating a digital key process when the NFC tagging and the pairing of the mobile device with the audio device have occurred, operation S304 of displaying a user interface requesting confirmation to register the digital key on an in-vehicle display device, or generating and sending an email requesting confirmation to register the digital key, and operation S305 of determining whether the registration request was received through the user interface or through a link included in the email. Furthermore, the method may include operation S306 of registering the digital key when the registration request is received through the user interface or through the link included in the email, and operation S307 of not registering the digital key when the registration request is not received through the user interface and is not received through the link included in the email.

Figure 4:
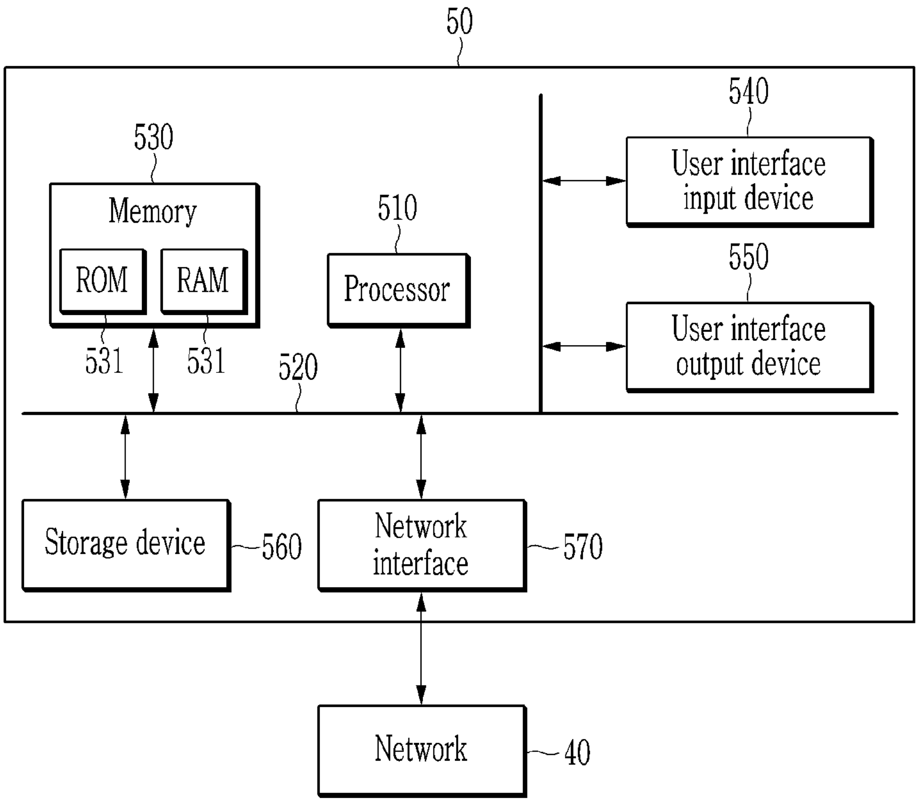
FIG. 4 is a diagram illustrating a determining device according to an exemplary embodiment of the present disclosure.

FIG. 4 is a diagram illustrating a computing device according to an exemplary embodiment of the present disclosure.

Referring to FIG. 4, the digital key pairing device and method for the vehicle according to the exemplary embodiments may be implemented by use of a computing device 50.

The computing device 50 may include at least one of a processor 510, a memory 530, a user interface input device 540, a user interface output device 550, and a storage device 560 communicating via a bus 520. The computing device 50 may also include a network interface 570 that electrically connects to the network 40. The network interface 570 may transmit or receive signals to or from other entities over the network 40.

The processor 510 may be implemented in various types, such as a Microcontroller Unit (MCU), Application Processor (AP), Central Processing Unit (CPU), Graphic Processing Unit (GPU), and Neural Processing Unit (NPU), and may be any semiconductor device that executes instructions stored in the memory 530 or the storage device 560. The processor 510 may be configured to implement the functions and methods described above with respect to FIG. 1, FIG. 2, and FIG. 3.

The memory 530 and the storage device 560 may include various forms of volatile or non-volatile storage media. For example, the memory may include a Read-Only Memory (ROM) 531 and a Random Access Memory (RAM) 532. In the present example embodiment, the memory 530 may be located inside or outside of the processor 510, and the memory 530 may be coupled to the processor 510 through various means already known.

In some exemplary embodiments, at least some configurations or functions of the digital key pairing device and method for the vehicle according to the exemplary embodiments may be implemented as a program or software executed on the computing device 50, and the program or software may be stored on a computer-readable medium. The computer-readable medium according to the exemplary embodiment of the present disclosure may be a program recorded on a computer including the processor 510 executing the program or instructions stored in the memory 530 or the storage device 560, for executing operations included in the digital key pairing method according to the exemplary embodiments.

In some exemplary embodiments, at least some configurations or functions of the digital key pairing device and method for the vehicle according to the exemplary embodiments may be implemented by use of hardware or circuits of the computing device 50, or may be implemented as separate hardware or circuits that may be electrically coupled to the computing device 50.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A digital key pairing device, comprising:

a memory; and a processor coupled to the memory and configured to:

detect that a mobile device is located on a wireless charger and NFC tagging is occurred;

detect a pairing of the mobile device with an audio device;

initiate a digital key process in response that the NFC tagging and the pairing with the audio device have occurred;

display a user interface requesting confirmation to register a digital key on an in-vehicle display device; and register the digital key in response that an registration request is received through the user interface, wherein the digital key is paired via the wireless charger, and wherein the NFC tagging is accomplished by bringing the mobile device up to the wireless charger.

2. The digital key pairing device of claim 1, wherein the processor is configured not to register the digital key in response that a cancel input is received through the user interface.

3. The digital key pairing device of claim 1, wherein the processor is further configured to generate and send an email requesting confirmation to register the digital key.

4. The digital key pairing device of claim 3, wherein the processor is further configured to register the digital key in response that an registration request is received through a link included in the email.

5. The digital key pairing device of claim 1, wherein the processor does not initiate the digital key process even when the NFC tagging and the pairing with the audio device have occurred in response that a digital key teaching mode is disabled on the mobile device.

6. The digital key pairing device of claim 1, wherein the processor is further configured to change vehicle audio Bluetooth from an OFF state to an ON state in response that a digital key teaching mode is enabled on the mobile device.

7. A digital key pairing method, comprising:

detecting that a mobile device is located on a wireless charger and Near Field Communication (NFC) tagging has occurred;

detecting that a pairing of the mobile device with an audio device has occurred;

in response that the NFC Tagging and the pairing with the audio device have occurred, initiating a digital key process;

displaying a user interface requesting confirmation to register a digital key on an in-vehicle display device; and registering the digital key in response that an registration request is received through the user interface, wherein the digital key is paired via the wireless charger, and wherein the NFC tagging is accomplished by bringing the mobile device up to the wireless charger.

8. The digital key pairing method of claim 7, wherein the registering of the digital key includes not registering the digital key in response that a cancel input is received through the user interface.

9. The digital key pairing method of claim 7, further including:

generating and sending an email requesting confirmation to register the digital key.

10. The digital key pairing method of claim 9, wherein the registering of the digital key includes registering the digital key in response that an registration request is received through a link included in the email.

11. The digital key pairing method of claim 7, wherein the initiating of the digital key process includes not initiating the digital key process even when the NFC tagging and the pairing with the audio device has occurred in response that a digital key teaching mode is disabled on the mobile device.

12. The digital key pairing method of claim 7, further including:

changing vehicle audio Bluetooth from an OFF state to an ON state in response that a digital key teaching mode is enabled on the mobile device.

* * * * *